(12) United States Patent
Sagalowicz et al.

(10) Patent No.: US 12,690,600 B2
(45) Date of Patent: Jul. 28, 2026

(54) LOW pH CO-EXTRACTION METHOD OF PREPARING A STABLE OIL BODY SOLUTION

(71) Applicant: SOCIETE DES PRODUITS NESTLE S.A., Vevey (CH)

(72) Inventors: Laurent Sagalowicz, Blonay (CH); Olivier Schafer, Epalinges (CH); Jwanro Husson, Lausanne (CH); Lilian Barro, La ville Aux Dames (FR); Fabiola Dionisi, Epalinges (CH); Marianne Studer, Morrens (CH)

(73) Assignee: SOCIETE DES PRODUITS NESTLE S.A., Vevey (CH)

( * ) Notice: Subject to any disclaimer, the term of this patent is extended or adjusted under 35 U.S.C. 154(b) by 238 days.

(21) Appl. No.: 18/547,801

(22) PCT Filed: Feb. 25, 2022

(86) PCT No.: PCT/EP2022/054793
§ 371 (c)(1),
(2) Date: Aug. 24, 2023

(87) PCT Pub. No.: WO2022/180211
PCT Pub. Date: Sep. 1, 2022

(65) Prior Publication Data
US 2024/0122199 A1 Apr. 18, 2024

(30) Foreign Application Priority Data
Feb. 26, 2021 (EP) ...................................... 21159743

(51) Int. Cl.
| | |
|---|---|
| A23D 7/04 | (2006.01) |
| A23D 7/00 | (2006.01) |
| A23L 2/52 | (2006.01) |
| A23L 23/00 | (2016.01) |
| C11B 1/04 | (2006.01) |
| C11B 3/00 | (2006.01) |
| C11B 3/16 | (2006.01) |

(52) U.S. Cl.
CPC .............. *A23D 7/04* (2013.01); *A23D 7/003* (2013.01); *A23L 2/52* (2013.01); *A23L 23/00* (2016.08); *C11B 1/04* (2013.01); *C11B 3/008* (2013.01); *C11B 3/16* (2013.01)

(58) Field of Classification Search
CPC .............. C11B 1/04; C11B 3/008; C11B 3/16
See application file for complete search history.

(56) References Cited

FOREIGN PATENT DOCUMENTS

| | | | | |
|---|---|---|---|---|
| CA | 2275489 | 6/1998 | | |
| CN | 108175721 A | * 6/2018 | ............. | A61K 8/988 |
| WO | WO-9827115 A1 | * 6/1998 | ............... | C08B 1/00 |
| WO | 2009126302 | 10/2009 | | |
| WO | 2013175203 | 11/2013 | | |
| WO | WO 2016/114201 A1 | 7/2016 | | |
| WO | 2020124268 | 6/2020 | | |

OTHER PUBLICATIONS

CN 108175721-A, Machine Translation English, Jun. 19, 2018, pp. 1-4 (Year: 2018).*
Iwanaga, D. et al. "Extraction and Characterization of Oil Bodies from Soy Beans: A Natural Source of Pre-Emulsified Soybean Oil" J. Agric. Food Chem. 2007, 55, 8711-8716 (Year: 2007).*
Iwanaga et al. "Extraction and Characterization of Oil Bodies from Soy Beans: A Natural Source of Pre-Emulsified Soybean Oil" Journal of Agricultural and Food Chemistry, 2007, vol. 55, pp. 8711-8716.
Iwanaga et al. "Stabilization of Soybean Oil Bodies Using Protective Pectin Coatings Formed by Electrostatic Deposition" Journal of Agricultural and Food Chemistry, 2008, vol. 56, pp. 2240-2245.
Anonymous "1st International Conference on Oil Bodies Natural Oil Droplets Ingredients for Industry Book of Abstracts", Jan. 1, 2018, retrieved from the Internet at https://oilbodies-live-0db8dff38e2a4eaa934d7766-0e077c2.divio-media.net/filer_public/ba/37/ba37dc25-a6ea-45dc-84ee-3cb4603bd275/book_of_abstracts_ final.pdf, XP055771385.
Japanese Office Action (w/ English translation) in corresponding JP Application No. 2023-550229, dated Jan. 20, 2026, in 9 pgs.
Wu, N., et al., "Stabilization of soybean oil body emulsions using κ, τ, λ-carrageenan at different pH values", Food Research International, 44 (2011), pp. 1059-1068.

* cited by examiner

*Primary Examiner* — Andrew S Rosenthal
(74) *Attorney, Agent, or Firm* — Dority & Manning, P.A.

(57) ABSTRACT

The invention relates to a method of preparing an oil body cream, said method comprising the steps of a) Preparing a suspension of i) a seed material; and ii) a non-seed plant material or seed extract material; b) adjusting the pH of the suspension to between 6.5 to 10; c) mechanically disrupting the suspension to form a slurry; d) diluting the slurry with buffer, wherein said buffer has a pH between 6.5 to 10; e) filtering the slurry to form an oil body solution; f) adjusting the pH to between 1.5 to 4, preferably to pH 2.7; g) separating the upper oil body cream layer, and h) optionally freeze drying the oil body cream to form an oil body powder.

18 Claims, 2 Drawing Sheets

LOW pH CO-EXTRACTION METHOD OF PREPARING A STABLE OIL BODY SOLUTION

CROSS REFERENCE TO RELATED APPLICATIONS

The present application is a National Stage of International Application No. PCT/EP2022/054793, filed on Feb. 25, 2022, which claims priority to European Patent Application No. 21159743.0, filed on Feb. 26, 2021, the entire contents of which are being incorporated herein by reference.

INTRODUCTION

Lipid oxidation is a strong limitation in food products generating off tastes and off flavors. Oil bodies are a natural form of lipid storage in plants mainly from seeds & nuts. They have a spherical structure, and a unique combination of proteins, lipids and phospholipids. This unique structure is protecting lipids from oxidation and it has a stable emulsion character.

Oil bodies can be used to protect polyunsaturated fatty acids (PUFAs) such as omega 3 fatty acids. Extracted plant oil bodies have relatively weak electrostatic repulsion between them which makes them physically unstable and limits their application in many foods.

Various types of components have been added to oil body preparations to improve their stabilities. Iwanaga et al, *J. Agric. Food Chem.* 56: 2240-2245 (2008) reported that pectin-coated oil bodies have similar or improved stability compared to uncoated oil bodies. WO 2017/066569 relates to an oil body composition containing oil bodies of different D50 size distribution from two different sources. The oil bodies are prepared separately and then combined to have the oil bodies preparation containing oil bodies of different size distribution. It is proposed to use preservatives to stabilize the oleosome preparation.

A clear need exists to develop a natural, clean label stabilizing system to maintain the integrity of oil bodies for food applications.

SUMMARY OF THE INVENTION

The inventors of the present application have developed a natural stabilizing system which maintains the integrity of oil bodies for longer periods than prior art methods. It protects against PUFA oxidization for food applications, with minimal processing. It meets consumer demand for clean label ingredient lists, and avoids the use of additives such as lecithin and maltodextrin. The invention delivers both physical and chemical stability using specific combinations of seeds and plant raw materials rich in proteins, polysaccharides and antioxidants. Particularly stable oil body solutions were obtained when the following combinations of i) a seed material; and ii) a non-seed plant material or seed extract material, were used in the method of the invention: chia and chia seed mucilage, hemp and pumpkin, and hemp and dates.

In a first aspect, the invention relates to a method of preparing an oil body cream, said method comprising the steps of a. Preparing a suspension comprising i) a seed material; and ii) a non-seed plant material or seed extract material;

b. Adjusting if necessary the pH of the suspension to greater than 6, preferably to between 6.5 to 10;

c. Mechanically disrupting the suspension to form a slurry;

d. Diluting the slurry with a buffer, wherein said buffer has a pH between 6.5 to 10;

e. Filtering or centrifuging the slurry to form an oil body solution;

f. Adjusting the pH to between 1.5 to 4, preferably to pH 2.7;

g. Separating the upper oil body cream layer; and h. Optionally freeze drying the oil body cream to form an oil body powder.

In a second aspect, the invention relates to an oil body cream obtained by a method as described herein, or powder thereof.

In a third aspect, the invention relates to a food product comprising an oil body cream or powder thereof as described herein.

EMBODIMENTS OF THE INVENTION

Figure 1:
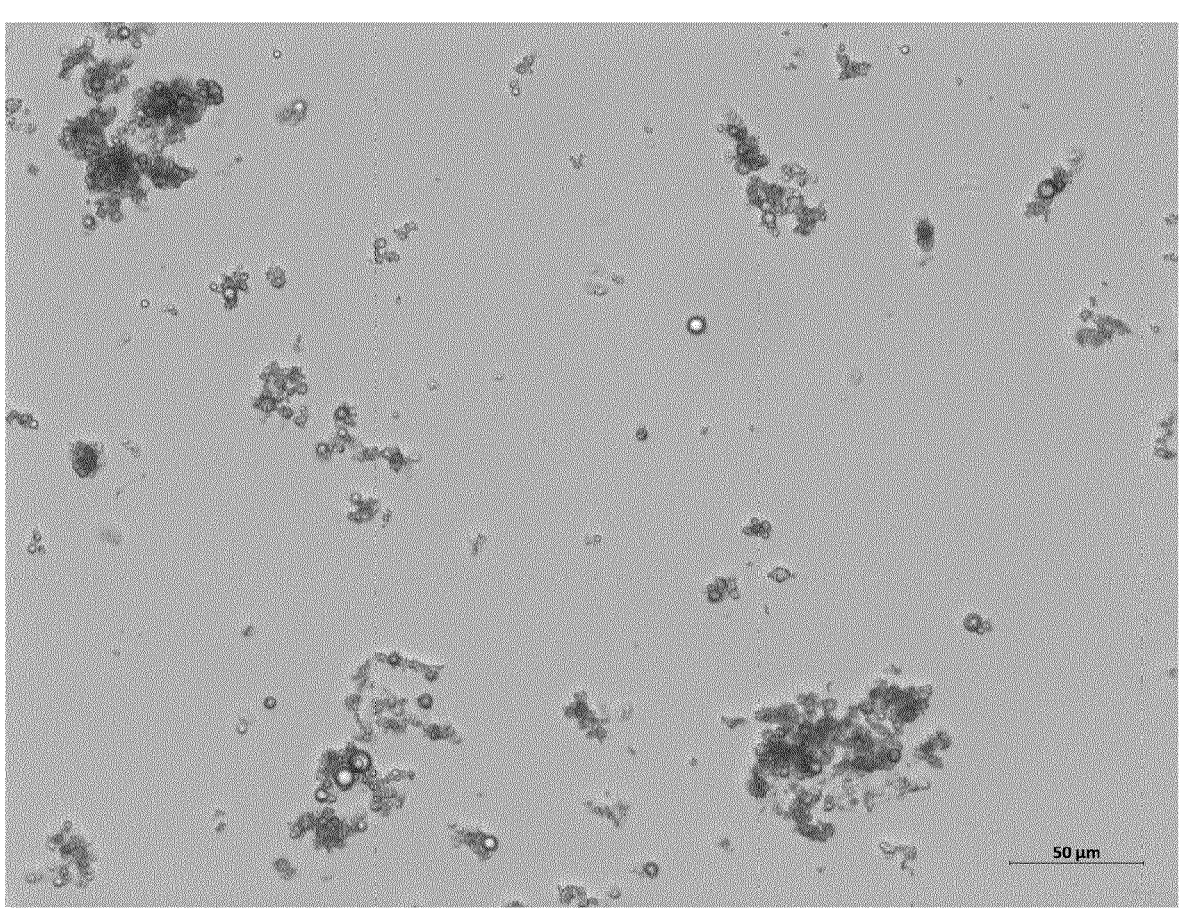
FIG. 1: Chia oil bodies accumulated in plant materials
Figure 2:
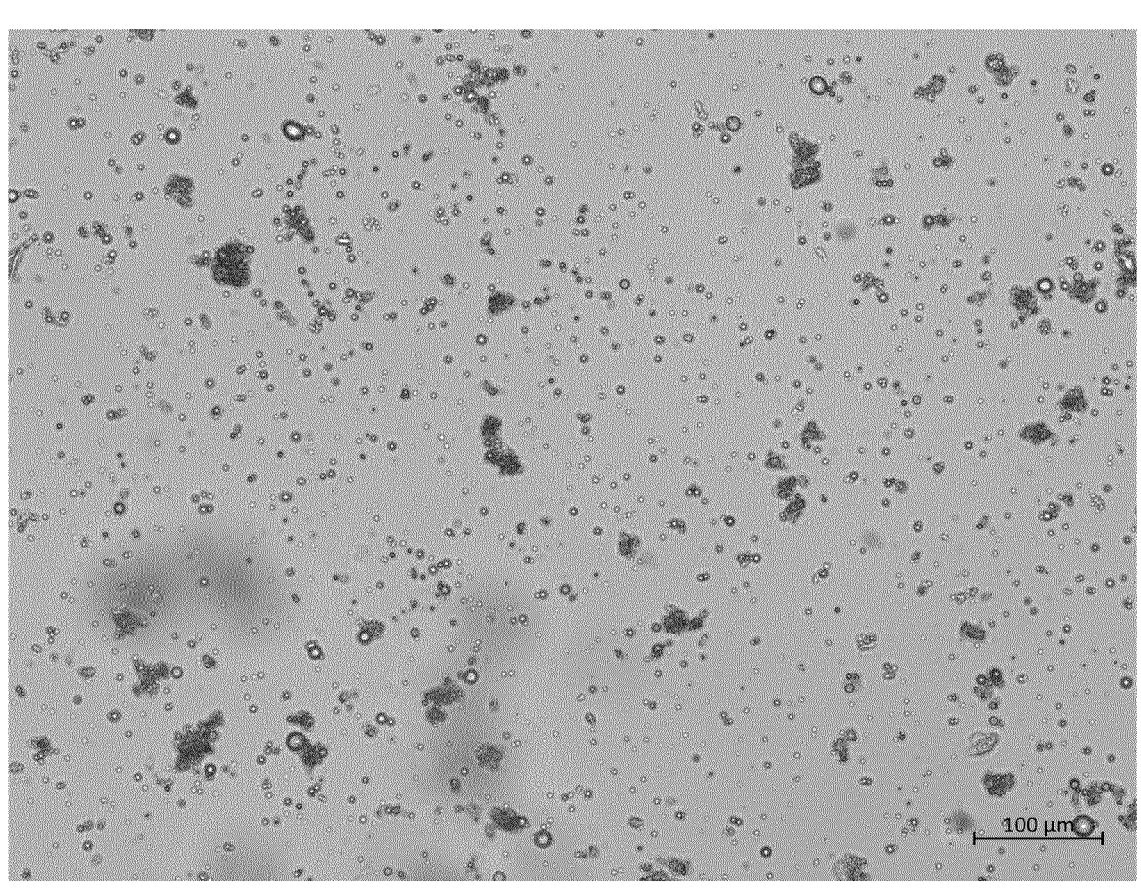
FIG. 2: Hemp oil bodies in hemp-pumpkin cream

The method of the invention allows the formation of stable plant extracts in liquid and powder formulations.

In a first aspect, the invention relates to a method of preparing an oil body cream, said method comprising the steps of preparing a slurry comprising i) a seed material; and ii) a non-seed plant material or seed extract material, wherein the pH of the slurry is greater than 6, preferably between 6.5 to 10; filtering or centrifuging the slurry to form an oil body solution; adjusting the pH to between 1.5 to 4, preferably to pH 2.7 and allowing the solution to form layers, for example by allowing it to settle or centrifuging; separating an upper layer comprising oil body cream; and optionally freeze drying the oil body cream to form an oil body powder.

In a further aspect, the invention relates to a method of preparing an oil body cream, said method comprising the steps of preparing a suspension comprising i) a seed material; and ii) a non-seed plant material or seed extract material, wherein the pH of the suspension is greater than 6, preferably between 6.5 to 10; mechanically disrupting the suspension to form a slurry; filtering or centrifuging the slurry to form an oil body solution; adjusting the pH to between 1.5 to 4, preferably to pH 2.7 and allowing the solution to form layers, for example by allowing it to settle or centrifuging; separating an upper layer comprising oil body cream; and optionally freeze drying the oil body cream to form an oil body powder.

In a further aspect, the invention relates to a method of preparing an oil body cream, said method comprising the steps of preparing a suspension comprising i) a seed material; and ii) a non-seed plant material or seed extract material; adjusting the pH of the suspension to greater than 6, preferably to between 6.5 to 10; mechanically disrupting the suspension to form a slurry; filtering or centrifuging the slurry to form an oil body solution; adjusting the pH to between 1.5 to 4, preferably to pH 2.7 and allowing the solution to form layers, for example by allowing it to settle or centrifuging; separating an upper layer comprising oil body cream; and optionally freeze drying the oil body cream to form an oil body powder.

In a further aspect, the invention relates to a method of preparing an oil body cream, said method comprising the steps of a. Preparing a suspension of i) a seed material; and ii) a non-seed plant material or seed extract material in an aqueous phase; and wherein the seed material and non-seed material or seed extract material are present in a dry weight ratio of between 50:50 to 95:5;

b. Adjusting the pH of the suspension to greater than 6, preferably to between 6.5 to 10;

c. Mechanically disrupting the suspension to form a slurry;

d. Diluting the slurry with buffer, wherein said buffer has a pH between 6.5 to 10;

e. Filtering or centrifuging the slurry to form an oil body solution;

f. Adjusting the pH to between 1.5 to 4, preferably to about pH 2.7 and allowing the solution to form layers, for example by allowing it to settle or centrifuging;

g. Separating an upper layer comprising oil body cream; and h. Optionally freeze drying the oil body cream to form an oil body powder.

Preferably, the seed material and non-seed plant material are derived from different plant sources.

Certain ranges of protein and carbohydrate contents of the seed material and non-seed material or seed extract material used in the process improve oil body stabilization. In some embodiments, the seed material has a protein content between 13 and 30%. In some embodiments, the seed material has a carbohydrate content between 8 and 27%. In some embodiments, the non-seed material or seed extract material has a protein content between 4 and 25%. In some embodiments, the non-seed material or seed extract material has a carbohydrate content between 16 and 35%.

In some embodiments, the total omega-3 and omega-6 content of the seed material is between 10 and 60% of its total oil content.

It has been found that specific combinations of seed material and non seed or raw materials lead to improved oil body stabilization.

Preferably, the seed material is from the plant sources hemp, chia, flax, sunflower, sesame, watermelon, egusi, rapeseed, and walnut.

More preferably, the seed material is from hemp, flax, and chia.

In some embodiments, the non-seed material or seed extract material is from the plant sources chia seed mucilage, pumpkin, plum, goji, jujube, aloe vera, apple, chestnut, lentil, flageolet, chickpea, mung bean, quinoa, pea, fava, kidney, black and white beans, potato peel, okra, ignames, taro, marshmallow, and mucilages from fenugreek, yellow mustard, basil, tamarin, and cresson.

Preferably, the non-seed material or seed extract material is from the plant sources chia seed mucilage, pumpkin, plum, chestnut, lentil, flageolet, mung bean, quinoa, fava, kidney, black and white beans, okra, taro, marshmallow, and mucilages from fenugreek, yellow mustard, basil, tamarin, and cresson.

Preferably, the non-seed material or seed extract material is from fruits, for example plum, dates, goji, jujube, aloe vera, and/or chestnut. The plum is preferably fresh plum. The dates are preferably fresh dates.

Preferably, the non seed material is from legumes, for example pumpkin, okra, ignames, taro, and/or marshmallow. The pumpkin is preferably fresh pumpkin.

Preferably, the non seed material is mucilage, for example from fenugreek, yellow mustard, basil, tamarin, and/or cresson.

More preferably, the non-seed material or seed extract material is from the plant sources chia seed mucilage, dates and pumpkin. Preferably, the chia seed mucilage is made by water extraction.

Specific seed material and non-seed material or seed extract material combinations were found to provide particularly stable oil body creams. Most preferably, the seed material and non-seed material or seed extract material are from the following plant source combinations:

i. Chia and chia seed mucilage;

ii. Hemp and pumpkin; and iii. Hemp and dates.

In one embodiment, the seed material and seed extract material are from chia and chia seed mucilage, respectively. In one embodiment, the seed material and non-seed material or seed extract material are from hemp and pumpkin, respectively. In one embodiment, the seed material and non-seed material or seed extract material are from hemp and dates, respectively.

In some embodiments, the non-seed material further comprises cocoa powder. In some embodiments, the non-seed material further comprises coffee powder.

Preferably, the seed material and non-seed material or seed extract material are present in the suspension in a ratio of about 80:20 dry weight. Preferably, the ratio of seed material and non-seed material or seed extract material to buffer is about 1:6 (w/v).

In some embodiments, coffee powder or cocoa powder are added to the suspension before mechanical disruption.

The aqueous phase is preferably a buffer. The buffer may be any alkaline buffer, for example a phosphate buffer or $Na_2CO_3$ buffer, for example $Na_2CO_3$ buffer of about 0.05M. Preferably, the buffer is about pH 9.5.

The buffer suspension in step a) may be heat treated, for example at between 85 to 105° C., for example at about 95° C., for example for about 15 mins.

Preferably, the seed material and non-seed material or seed extract material are soaked, preferably for about 1 hour, preferably at room temperature.

The method of the invention uses a combination of blending, heat treatment, and filtration steps. The advantage over prior art methods is that the integrity of the oil bodies is maintained and the heat treatment appears to reinforce the oil body-protein-polysaccharide complexes.

In some embodiments, step a) comprises suspending the seed material and the non-seed material or seed extract material separately in a buffer at about pH 6.5 to pH 10, followed by mixing to form a suspension.

In some embodiments, the buffer suspension in step a) is heated to between 90 to 120° C., followed by cooling to between 4 to 30° C.

In some embodiments, the buffer suspension is cooled to between 4 to 30° C. for at least 1 hour, for example before mechanically disrupting to form a slurry.

In some embodiments, the buffer suspension is mechanically disrupted by grinding to form a slurry.

In some embodiments, in step (e) the slurry is filtered using a filter with pore size of 200 μm or less, to provide a first retentate separated from a first filtrate.

In some embodiments, (i) the first retentate is added to buffer at between pH 1.5 and 4 and filtered using a filter with pore size of 200 μm or less, to provide a second retentate separated from a second filtrate; and (ii) the first filtrate and second filtrate are combined to form an oil body solution.

The invention further relates to an oil body cream, or powder thereof, for example an oil body cream obtained by a method as described herein, or powder thereof. Preferably, the oil body cream comprises between 10 to 60 wt % oil, preferably between 15 to 60 wt % oil.

In some embodiments, said oil body cream comprises oil bodies having an average D [3;2] particle size between 4 μm to 26 μm measured using static light scattering, Dx (90) μm, Dx (50) μm, and Dx (10) μm average particle sizes were also measured using static light scattering. In one embodiment, the Dx (90) μm is between 50 to 500 μm. In one embodiment, the Dx (50) μm is between 5 to 250 μm. In one embodiment, the Dx (10) μm is between 1 to 55 μm. In one embodiment, the span is between 1 to 10. Span is defined as described herein. The preferred particle sizes vary by not greater than 30% from the particle sizes shown in the examples.

Preferably, static light scattering is measured using a Mastersizer 30%. The size of all particles in the solution is measured.

The % TS (total solid) content of the oil body creams were measured. In one embodiment, the % total solid content of the oil body cream is less than 25%, preferably between 1 to 25%, preferably between 1 to 20%, preferably between 1 to 15%.

Preferably, said solution has a pH between 1.5 to 4.

In one embodiment, the oil body cream is transformed into a fermented plant based product, for example a yogurt alternative. In one embodiment, a plant composition comprising the oil body cream or the oil body cream itself is added with at least one bacterial culture to form a fermentable mixture. The bacterial culture may comprise one or several lactic acid-producing bacteria. The fermentable mixture is maintained, for example at 45° C., for example between 4 to 6 hours.

The invention further relates to a food product comprising an oil body cream or powder as described herein.

Preferably, the food product is selected from plant milks, sauces, dips, ice cream, confectionery, alternative chilled dairy, and baby food, preferably plant milk, alternative chilled dairy, sauces, or dips. The alternative chilled dairy is preferably yogurt analogue. The food product may be in a liquid form or may be in a powder form.

Preferably, the food product is a vegetarian or vegan food product.

DETAILED DESCRIPTION OF THE INVENTION

When a composition is described herein in terms of wt % (weight percent), this means wt % of the total recipe, unless indicated otherwise.

As used herein, "about" is understood to refer to numbers in a range of numerals. In one embodiment, "about" refers to a range of −30% to +30% of the referenced number. In one embodiment, "about" refers to a range of −20% to +20% of the referenced number. In one embodiment, "about" refers to a range of −10% to +10% of the referenced number. In one embodiment, "about" refers to a range of −5% to +5% of the referenced number. In one embodiment, "about" refers to a range of −1% to +1% of the referenced number. All numerical ranges herein should be understood to include all integers, whole or fractions, within the range.

"Mechanical disruption" as described herein can be, for example, grinding, micronisation, hammer milling, or colloidal milling.

"Span" of a volume-based size distribution is defined as Span=(D90−D10)/D50. The span value gives an indication of how far the 10 percent and 90 percent points are apart, normalized with the midpoint.

The term "vegan" refers to an edible composition which is entirely devoid of animal products, or animal derived products.

The term "vegetarian" refers to an edible composition which is devoid of meat, including fish.

Typically, the seed material has a protein content between 13 and 30%. For example, chia may have a protein content from 15 to 24%, hemp may have a protein content from 25 to 30%.

Typically, the seed material has a carbohydrate content between 8 and 27%. For example, chia may have a carbohydrate content from 25 to 41%, and hemp may have a carbohydrate content from 25 to 27%.

Chia, *Salvia hispanica* L., is an annual plant grown commercially for its seed, a food rich in omega-3 fatty acids. Chia genotype are numerous but mainly two varieties exist: black chia and white chia. Their composition can differ (32% oil for Tzotzol (black chia), 27% oil for Iztac II (white chia)). The fat content may be 30-34 g/100 g. The omega-3 content may be about 17%. The omega-6 content may be about 5%. The saturated fat content may be about 3.3 g/100 g.

Typically, the non-seed material or seed extract material has a protein content between 4 and 25%. Pumpkin may have a protein content of about 10%.

Typically, the non-seed material or seed extract material has a carbohydrate content between 16 and 35%. Pumpkin may have a carbohydrate content of about 25%.

The following raw materials may be suited for stabilizing chia oil bodies: Beans (Lentil, flageolet, chickpea, mung bean, quinoa, pea, fava, kidney, black and white beans), Legumes (Potato peel), and seeds (moringa, oat), more preferably, beans (Lentil, flageolet, mung bean, quinoa, fava), Legumes (okra), and seeds (moringa, oat). For example, lentil is particularly well suited.

The following raw materials may be suited for stabilizing hemp oil bodies: Fruits (plum, goji, jujube, aloe vera, apple, chestnut, Legumes (Pumpkin, okra, ignames, taro, marshmallow), and seeds (Fenugreek, yellow mustard, basil, tamarin, cresson), more preferably fruits (plum, chestnut, Legumes (Pumpkin, okra, taro, marshmallow), and seeds (Fenugreek, yellow mustard, basil, tamarin, cresson). For example, pumpkin is particularly well suited.

The omega-3 content of the seed material is preferably between 10 and 60% of its oil content. The omega-3 content of the non-seed material or seed extract material is preferably between 10 and 60% of its oil content.

Typically, the omega-6 content of the seed material is between 15 and 65% of its oil content.

The invention relates to a method of preparing an oil body cream, said method comprising the steps of a) preparing a buffer suspension of chia seed material and chia seed mucilage material in a buffer, wherein the chia seed material and chia seed mucilage material are present in a dry weight ratio of between 50:50 to 95:5, preferably about 80:20; b) adjusting the pH of the suspension to between 6.5 to 10, preferably about 9.5; c) mechanically disrupting the suspension to form a slurry; d) diluting the slurry with buffer, wherein said buffer has a pH between 6.5 to 10, preferably about 9.5; e) filtering or centrifuging the slurry to form an oil body solution; f) adjusting the pH to between 1.5 to 4, preferably to about pH 2.7 and allowing the solution to form layers, for example by allowing it to settle or centrifuging; g) separating an upper layer comprising oil body cream; and h) optionally freeze drying the oil body cream to form an oil body powder.

The invention relates to a method of preparing an oil body cream, said method comprising the steps of a) preparing a buffer suspension of hemp material and pumpkin material in a buffer, wherein the hemp material and pumpkin material are present in a dry weight ratio of between 50:50 to 95:5, preferably about 80:20; b) adjusting the pH of the suspension to between 6.5 to 10, preferably about 9.5; c) mechanically disrupting the suspension to form a slurry; d) diluting the slurry with buffer, wherein said buffer has a pH between 6.5 to 10, preferably about 9.5; e) filtering or centrifuging the slurry to form an oil body solution; and f) adjusting the pH to between 1.5 to 4, preferably to about pH 2.7 and allowing the solution to form layers, for example by allowing it to settle or centrifuging; g) separating an upper layer comprising oil body cream; and h) optionally freeze drying the oil body cream to form an oil body powder.

The invention relates to a method of preparing an oil body cream, said method comprising the steps of a) preparing a buffer suspension of hemp material and date material in a buffer, wherein the hemp material and date material are present in a dry weight ratio of between 50:50 to 95:5, preferably about 80:20; b) adjusting the pH of the suspension to between 6.5 to 10, preferably about 9.5; c) mechanically disrupting the suspension to form a slurry; d) diluting the slurry with buffer, wherein said buffer has a pH between 6.5 to 10, preferably about 9.5; e) filtering or centrifuging the slurry to form an oil body solution; and f) adjusting the pH to between 1.5 to 4, preferably to about pH 2.7 and allowing the solution to form layers, for example by allowing it to settle or centrifuging; g) separating an upper layer comprising oil body cream; and h) optionally freeze drying the oil body cream to form an oil body powder.

In step a), the temperature range used is 90 to 100° C., or 92 to 98° C., or 94 to 96° C., or about 95° C. For extraction, the temperature range used is 4° C. to 30° C., preferably about 20° C. For storage, the temperature range used is 4° C. to 12° C. The oil body cream may be freeze dried to form a powder.

The invention also relates to an oil body cream obtained by a method as described herein, or powder thereof. The oil body cream is made from seed material from the plant sources hemp, chia, flax, sunflower and walnut, and from non-seed material or seed extract material from the plant sources pumpkin, plum, goji, jujube, aloe vera, apple, chestnut, lentil, flageolet, chickpea, mung bean, quinoa, pea, fava, kidney, black and white beans, potato peel, okra, ignames, taro, marshmallow, and mucilages from fenugreek, yellow mustard, basil, tamarin, and cresson.

Preferably, the seed material and non-seed material or seed extract material are from the following plant source combinations: Chia and chia seed mucilage, hemp and pumpkin, and hemp and dates.

Preferably, said cream comprises oil bodies having an average D [3;2] particle size of between 4 μm to 26 μm. Preferably, the cream has a pH between 1.5 to 4, preferably about pH 2.7.

In one embodiment, the Dx (90) μm is between 50 to 500 μm. In one embodiment, the Dx (50) μm is between 5 to 250 μm. In one embodiment, the Dx (10) μm is between 1 to 55 μm. In one embodiment, the span is between 1 to 10. Span is defined as described herein. The preferred particle sizes for a given oil body cream should vary by not greater than 30% from the D [3;2] particle sizes shown in the examples.

The invention also relates to a food product comprising an oil body cream or powder as described herein. Preferably, the food products are selected from smoothies, plant milks, sauces, dips, ice cream, confectionery, alternative chilled dairy, and baby food.

The food product may be chia-mucilage fresh cream mixed with a smoothie, wherein said smoothie is made of apple, pineapple, kiwi, whole grape and lemon juice.

The food product may be in a liquid form or may be in a powder form.

EXAMPLES

Example 1: Production of Chia Polysaccharides 100 g of chia seeds was added to 500 mL of deionized water in a container. The chia polysaccharides were extracted by ultrasound (5 seconds pulses of activity separated by 10 seconds break, over 30 minutes). The polysaccharides solution from seeds was separated using a strainer. The polysaccharides solution was used either fresh or frozen, freeze-dried and stored at −20° C.

Example 2: Production of Oil Body Solution from Chia Seeds and Chia Seed Mucilage at Low pH without Centrifugation Chia seeds and chia seed mucilage (ratio 80:20) were suspended in 0.05M $Na_2CO_3$ buffer at pH 9.5 (adjusted with 1M HCl), (ratio1:6, w/v) and heat treated at 95° C. for 15 min in a water bath. They were then soaked during 1 hour at room temperature. The resulting slurry was ground for 30 s using a Waring blender at speed 1(1800 rpm) (Waring Blendor, USA). $Na_2CO_3$ buffer at pH 9.5 is added to reach a 1:10 w/v. The mixture was mixed at room temperature for 1 hour with a Heidolph overhead mixer (RZR 2021, Germany) then filtered using a 200 μm-pore size cheesecloth. The retentate was extracted again as above, i.e. mixed with $Na_2CO_3$ buffer (ratio 1:4, w/v) at room temperature for 30 min then filtered. The two filtrates were grouped together, and the pH is adjusted to 2.7 (using 1M HCl) to get the final oil body solution. The final oil body solution was heat-treated at 95° C. for 10 min in a water bath before to be let stand at room temperature. The final oil body solution was stored at 4° C. or freeze-dried and the resulting powder stored at 4° C.

|  | T 0 | T 2 (16 weeks) |
| --- | --- | --- |
| Phase separation | No phase separation | No phase separation |
| Smell | No fishy smell | No fishy smell |

Example 3: Production of Oil Body Cream from Chia Seeds and Chia Seed Mucilage at Low pH Chia seeds and chia seed mucilage (ratio 80:20) were suspended in 0.05M $Na_2CO_3$ buffer at pH 9.5 (adjusted with 1M HCl), (ratio1:6, w/v) and heat treated at 95° C. for 15 min in a water bath. They were then soaked during 1 hour at room temperature. The resulting slurry was ground for 30 s using a Waring blender at speed 1(1800 rpm) (Waring Blendor, USA). $Na_2CO_3$ buffer at pH 9.5 was added to reach a 1:10 w/v. The mixture was mixed at room temperature for 1 hour with a Heidolph overhead mixer (RZR 2021, Germany) then filtered using a 200 μm-pore size cheesecloth.

The pH was adjusted to 2.7 with 1M HCl. Milk was centrifuged (7000 rpm during 10 min at 4° C.) Separate top cream from liquid and "cake" using strainer (regular one from any kitchen) The retentate was extracted again as above, i.e. mixed with Na₂CO₃ buffer (ratio 1:4, w/v) at room temperature during 30 min then filtered, the pH adjusted to 2.7 and centrifuge following same parameters. The two creams were grouped to get the final oil body cream. The final oil body cream was stored at 4° C. or freeze-dried and the resulting powder stored at 4° C.

The chia-mucilage fresh cream was mixed with a smoothie for example made of apple, pineapple, kiwi, whole grape and lemon juice. To have a smoothies source of omega-3, 1.1 g of fresh cream (containing 0.3 g of a-linolenic acid) is added to 100 g of smoothie. To have a smoothies rich of omega-3; add 2.2 g fresh cream (containing 0.6 g of a-linolenic acid) to 100 g of smoothie. The mixed solution was then pasteurised at 90° C. for 2 mins, stored at 40° C. for 4 weeks.

|  | Smoothie source of omega-3 (4 weeks) | Smoothie rich of omega-3 (4 weeks) |
| --- | --- | --- |
| Phase separation | No phase separation | No phase separation |
| Smell | Pleasant smoothie smell | Pleasant smoothie smell |

Example 4: Production of Oil Body Cream from Hemp Seeds and Pumpkin

Hemp seeds and fresh pumpkin (ratio 80:20) were suspended in 0.05M NaCO₃ buffer at pH 9.5 (adjusted with 1M HCl), (ratio1:6, w/v) and heat treated at 95° C. for 15 min in a water bath. They were then soaked during 1 hour at room temperature. The resulting slurry was ground for 30 s using a Waring blender at speed 1(1800 rpm) (Waring Blendor, USA). Na₂CO₃ buffer at pH 9.5 is added to reach a 1:10 w/v. The mixture was mixed at room temperature for 1 hour with a Heidolph overhead mixer (RZR 2021, Germany) then filtered using a 200 μm-pore size cheesecloth. The retentate was extracted again as above, i.e. mixed with Na₂CO₃ buffer (ratio 1:4, w/v) at room temperature during 30 min then filtered. The two filtrates were grouped together, the pH is adjusted to 2.7 (using 1M HCl). The solution was centrifuged (7000 rpm during 10 min at 4° C.). The final oil body cream was stored at 4° C. or freeze-dried and the resulting powder stored at 4° C.

Actual quantities used for hemp seeds and fresh pumpkin: 80 g hemp seeds combined with 200 g fresh pumpkin (10% dry matter, total dry matter from 200 g fresh pumpkin: 20 g).

|  | T 0 | T 4 (6 weeks, ongoing) |
| --- | --- | --- |
| Phase separation | No phase separation | No phase separation |
| Smell | No fishy smell | No fishy smell |

The hemp-pumpkin fresh cream may be mixed with a red or green pepper sauce. The sauce is added drop by drop to the hemp-pumpkin cream until getting the desired taste.

Example 5: Production of Oil Body Cream from Hemp Seeds, Cocoa Powder and Dates Hemp seeds, cocoa powder and dates (ratio by weight 80:10:10) were suspended in water at pH 7.5 (adjusted with 1M HCl), (ratio1:6, w/v) and heat treated at 95° C. for 15 min in a water bath. The resulting slurry was ground during 30 s using a Waring blender at speed 1(1800 rpm) (Waring Blendor, USA). The mixture was mixed at room temperature during 1 hour with a Heidolph overhead mixer (RZR 2021, Germany) then filtered using a 200 μm-pore size cheesecloth. The pH was adjusted to 2.7 (using 1M HCl). The solution was centrifuged (2000 rpm for 3 min at 4° C.). The oil body cream has cocoa flavour and a creamy texture. The final oil body cream is stored at 4° C. or freeze-dried and the resulting powder stored at 4° C.

Example 6: Production of Oil Body Cream from Hemp Seeds, Coffee Powder and Dates Hemp seeds, roast and ground coffee and dates (ratio by weight 85:5:10) were suspended in water at pH 7.5 (adjusted with 1M HCl), (ratio1:6, w/v) and heat treated at 95° C. for 15 min in a water bath. The resulting slurry was ground for 30 s using a Waring blender at speed 1(1800 rpm) (Waring Blendor, USA). The mixture is mixed at room temperature for 1 hour with a Heidolph overhead mixer (RZR 2021, Germany) then filtered using a 200 μm-pore size cheesecloth. The pH was adjusted to 2.7 (using 1M HCl). The solution was centrifuged (2000 rpm during 3 min at 4° C.). The oil body cream had a coffee flavour and a creamy texture. The final oil body cream was stored at 4° C. or freeze-dried and the resulting powder stored at 4° C.

The invention claimed is:

1. A method of preparing an oil body cream, said method comprising the steps of
    a. preparing a suspension of i) a seed material; and ii) a non-seed plant material or seed extract material in an aqueous phase, wherein the seed material and non-seed material or seed extract material are present in a dry weight ratio of between 50:50 to 95:5,
    b. adjusting the pH of the suspension to greater than 6;
    c. mechanically disrupting the suspension to form a slurry;
    d. diluting the slurry with a buffer, wherein said buffer has a pH between 6.5 to 10;
    e. filtering or centrifuging the slurry to form an oil body solution;
    f. adjusting the pH to between 1.5 to 4, and allowing the solution to form layers; and
    g. separating an upper layer comprising an oil body cream;
    wherein the seed material and non-seed material are selected from a group of plant source combinations consisting of:
    i. chia and chia seed mucilage;
    ii. hemp and pumpkin; and
    iii. hemp and dates.

2. The method of claim 1, wherein the seed material has a protein content between 13 and 30% and a carbohydrate content between 8 and 27%, and the non-seed material has a protein content between 4 and 25% and a carbohydrate content between 16 and 35%.

3. The method of claim 1, wherein the omega-3 content of the seed material is between 10 and 60% of the oil content of the seed material.

4. The method of claim 1, wherein step a) comprises suspending the seed material and the non-seed material separately in a buffer at about pH 6.5 to about pH 10, followed by mixing to form the suspension.

5. The method of claim 1, wherein the suspension in step a) is heated to between 90 to 120° C., followed by cooling to between 4 to 30° C.

6. The method of claim 1, wherein the suspension in step a) is cooled to between 4 to 30° C. for at least 1 hour.

7. The method of claim 1, wherein in step c), the suspension is mechanically disrupted by grinding to form the slurry.

8. The method of claim 1, wherein in step e), the slurry is filtered using a filter with a pore size of 200 μm or less, to provide a first retentate separated from a first filtrate.

9. The method of claim 8, wherein (i) the first retentate is added to a buffer at between pH 6.5 to 10 and filtered using a filter with a pore size of 200 μm or less, to provide a second retentate separated from a second filtrate; and (ii) the first filtrate and second filtrate are combined to form the oil body solution.

10. The method of claim 1, wherein the average D [3;2] particle size of the oil bodies in the solution in step f) is between 4 μm to 26 μm, measured using static light scattering.

11. The method of claim 1, wherein the % total solid content of the oil body solution is between 1 to 15%.

12. An oil body cream prepared according to the method of claim 1, wherein said cream comprises oil bodies having an average D [3;2] particle size between 4 μm to 26 μm, measured using static light scattering, and wherein said oil body cream has a pH between 1.5 to 4.

13. A food product comprising an oil body cream prepared according to the method of claim 1, wherein said cream comprises oil bodies having an average D [3;2] particle size between 4 pm to 26 pm, measured using static light scattering, and wherein said oil body cream has a pH between 1.5 to 4, wherein said food product is selected from the group consisting of a plant milk, alternative chilled dairy, sauce, and dip.

14. The method of claim 1, wherein in step b), the suspension has a pH of between 6.5 to 10.

15. The method of claim 1, wherein in step f), the pH is adjusted to 2.7.

16. The method of claim 1, wherein the oil body cream has a pH of between 1.5 to 4.

17. The method of claim 1, wherein the method comprises a step h) of freeze drying the oil body cream to form a powder.

18. The method of claim 1, wherein in step f), the layers are formed via settling, centrifugation, or a combination thereof.

* * * * *